United States Patent
Skomurski et al.

(10) Patent No.: US 11,511,225 B2
(45) Date of Patent: Nov. 29, 2022

(54) CONTAMINANT CONCENTRATION AND REMOVAL SYSTEM USING LIQUID SORBENT

(71) Applicant: Honeywell International Inc., Morris Plains, NJ (US)

(72) Inventors: Sean Skomurski, Highland Park, IL (US); Peter M. Michalakos, Arlington Heights, IL (US); Rebecca Kamire, Buffalo Grove, IL (US); Stephen Yates, South Barrington, IL (US); Phoebe Henson, Scottsdale, AZ (US)

(73) Assignee: Honeywell International Inc., Charlotte, NC (US)

( * ) Notice: Subject to any disclaimer, the term of this patent is extended or adjusted under 35 U.S.C. 154(b) by 500 days.

(21) Appl. No.: 16/567,668

(22) Filed: Sep. 11, 2019

(65) Prior Publication Data
US 2021/0069635 A1  Mar. 11, 2021

(51) Int. Cl.
 *B01D 53/22* (2006.01)
 *B01D 53/14* (2006.01)
 *B01D 53/18* (2006.01)

(52) U.S. Cl.
CPC ..... *B01D 53/1443* (2013.01); *B01D 53/1412* (2013.01); *B01D 53/1425* (2013.01); *B01D 53/1475* (2013.01); *B01D 53/18* (2013.01); *B01D 53/229* (2013.01); *B01D 2252/30* (2013.01)

(58) Field of Classification Search
CPC ........... B01D 2252/30; B01D 2256/10; B01D 2256/12; B01D 2257/7022; B01D 2258/06; B01D 2259/4575; B01D 53/1412; B01D 53/1425; B01D 53/1443; B01D 53/1475;
(Continued)

(56) References Cited

U.S. PATENT DOCUMENTS 8,328,911 B2  12/2012  Liu et al.
8,876,945 B2  11/2014  Taylor et al.
(Continued)

OTHER PUBLICATIONS

Ma et al., "Carbon dioxide permeability of proton exchange membranes for fuel cells," Solid State Ionics, vol. 176, Science Direct, Dec. 2005, 5 pp.
(Continued)

*Primary Examiner* — Frank M Lawrence, Jr.
(74) *Attorney, Agent, or Firm* — Shumaker & Sieffert, P.A.

(57) ABSTRACT

A contaminant removal system for removing a contaminant from an environment includes a gas separator, a scrubber-separator downstream of the gas separator, and a stripper-separator downstream of the scrubber-separator. The gas separator is configured to receive a cabin air stream from the environment and concentrate the contaminant from the cabin air stream to produce a concentrated cabin air stream. The cabin air stream includes the contaminant, and the concentrated cabin air stream has a higher concentration of the contaminant than the cabin air stream. The scrubber-separator is configured to absorb the contaminant from the concentrated cabin air stream into a liquid sorbent and discharge a clean air stream to the environment. The stripper-separator is configured to desorb the contaminant from the liquid sorbent into a contaminant stream.

19 Claims, 7 Drawing Sheets

(58) Field of Classification Search
CPC ............... B01D 53/18; B01D 53/229; B64D
2013/0651; B64G 1/48; Y02C 20/40
USPC ............ 95/43, 45, 51, 52, 1, 159, 169, 236;
96/4, 7, 9, 243, 371, 365; 423/220, 228,
423/229
See application file for complete search history.

(56) References Cited

U.S. PATENT DOCUMENTS

| | | | |
|---|---|---|---|
| 9,186,622 B1* | 11/2015 | Ranjan | B01D 63/021 |
| 9,205,382 B2 | 12/2015 | Sawamura et al. | |
| 9,409,120 B2 | 8/2016 | Liu et al. | |
| 2011/0262328 A1 | 10/2011 | Wijmans et al. | |
| 2017/0327758 A1 | 11/2017 | Tanaka et al. | |
| 2018/0056233 A1 | 3/2018 | Henson et al. | |
| 2018/0056234 A1 | 3/2018 | Weng et al. | |
| 2018/0243682 A1* | 8/2018 | Isobe | B01D 53/1493 |
| 2018/0243685 A1 | 8/2018 | Henson et al. | |
| 2018/0265993 A1 | 9/2018 | Kamire et al. | |
| 2021/0373439 A1* | 12/2021 | Kamimura | G03F 7/20 |

OTHER PUBLICATIONS

Dai et al., "Nafion/PEG hybrid membrane for CO2 separation: Effect of PEG on membrane micro-structure and performance," Separation and Purification Technology, Mar. 26, 2018, 12 pp.

Zhang et al., "Absorber Performance with High CO2," Energy Procedia, vol. 63, Science Direct, Nov. 2014, 10 pp.

Favre, "Membrane processes and postcombustion carbon dioxide capture: Challenges and prospects," Chemical Engineering Journal, vol. 171, Science Direct, Jan. 2011, 12 pp.

U.S. Appl. No. 16/164,461, by Honeywell International, Inc. (Inventors: Henson et al.), filed Oct. 18, 2018.

U.S. Appl. No. 16/551,368, by Honeywell International Inc. (Inventors: Rebecca Kamire et al.), filed Aug. 26, 2019.

* cited by examiner

CONTAMINANT CONCENTRATION AND REMOVAL SYSTEM USING LIQUID SORBENT

TECHNICAL FIELD

The present disclosure relates to systems and techniques for removing contaminants from an environment using contaminant removal systems.

BACKGROUND

An environmental control system (ECS) may provide conditioned air to a passenger cabin or other environment. Some of this conditioned air may be recycled air from the cabin or environment from which the ECS has removed contaminants. In an open loop system, such contaminant removal from recycled air may reduce an amount of pressurized air supplied from other sources, while in a closed loop system, such contaminant removal from recycled air may conserve finite resources for life support systems. ECS components that are used to remove contaminants may be large and heavy, increasing an overall weight of the ECS.

SUMMARY

The disclosure describes systems and techniques for concentrating contaminants from cabin air environment and removing the contaminants using a liquid sorbent. A contaminant removal system may include a membrane scrubber-separator that removes contaminants from the cabin air through absorption using the liquid sorbent. The membrane scrubber-separator may more efficiently absorb contaminants at higher concentrations than at lower concentrations due to a higher concentration gradient across the membrane scrubber-separator at higher contaminant concentrations. Rather than directly supply the cabin air to the scrubber-separator for contaminant removal, the system may concentrate contaminants from the cabin air using a gas separator prior to supplying the cabin air to the scrubber-separator to increase the concentration gradient of the contaminant across the scrubber-separator. As a result, a smaller scrubber-separator receiving the higher concentration cabin air may produce an equivalent amount of clean air as a larger scrubber-separator receiving the lower concentration cabin air. This reduced size and/or weight of the scrubber-separator may offset any increase in size and/or weight from the gas separator, resulting in an overall smaller and/or lighter contaminant removal system.

In some examples, the disclosure describes a contaminant removal system for removing a contaminant from an environment. The contaminant removal system includes a gas separator, a scrubber-separator downstream of the gas separator, and a stripper-separator downstream of the scrubber-separator. The gas separator is configured to receive a cabin air stream from the environment and concentrate the contaminant from the cabin air stream to produce a concentrated cabin air stream. The cabin air stream includes the contaminant, and the concentrated cabin air stream has a higher concentration of the contaminant than the cabin air stream. The scrubber-separator is configured to absorb the contaminant from the concentrated cabin air stream into a liquid sorbent and discharge a clean air stream to the environment. The stripper-separator is configured to desorb the contaminant from the liquid sorbent into a contaminant stream.

In some examples, the disclosure describes a method for removing a contaminant from an environment that includes receiving, by a gas separator, a cabin air stream from an environment and concentrating, using the gas separator, the cabin air stream to produce a concentrated cabin air stream in which the concentrated cabin air stream has a higher concentration of the contaminant than the cabin air stream. The method further includes absorbing, by a scrubber-separator, the contaminant from the concentrated cabin air stream using a liquid sorbent to produce a clean air stream and discharging, by the scrubber-separator, the clean air stream to the environment. The method further includes desorbing, by a stripper-separator, the contaminant from the liquid sorbent to produce a contaminant stream.

In some examples, the disclosure describes a method for removing a contaminant from an environment that includes controlling, by a controller, at least one of a compressor fluidically coupled to a gas separator or a pressure control valve fluidically coupled to the gas separator to create a pressure differential across the gas separator. The gas separator is configured to receive a cabin air stream from an environment in which the cabin air stream includes the contaminant. The gas separator is further configured to concentrate the contaminant from the cabin air stream to produce a concentrated cabin air stream so that the concentrated cabin air stream has a higher concentration of the contaminant than the cabin air stream. The gas separator is further configured to discharge the concentrated cabin air stream to a scrubber-separator configured to absorb the contaminant from the concentrated cabin air stream using a liquid sorbent to produce a clean air stream. The gas separator is further configured to discharge a diluted cabin air stream into the environment in which the diluted cabin air stream has a lower concentration of the contaminant than the cabin air stream.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

Figure 1:
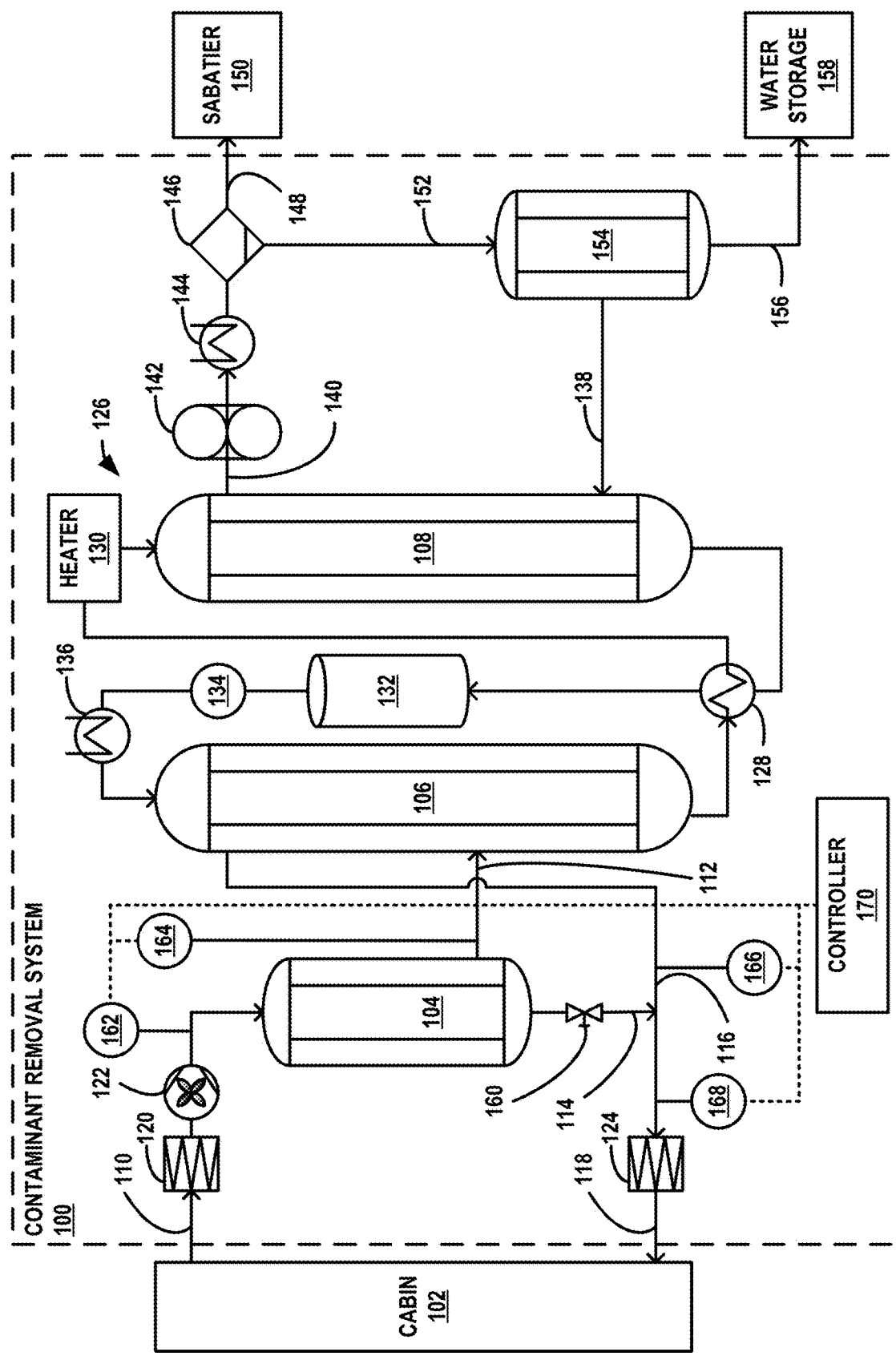
FIG. 1 is a diagram illustrating an example closed-loop contaminant removal system for concentrating contaminants from a cabin using a gas separator and removing the contaminants using a liquid sorbent.

Contaminant removal systems described herein may be utilized as part of an environmental control system (ECS), such as may be used in spacecraft, aircraft, watercraft, and the like. In some examples, contaminant removal systems may be used in an ECS of a resource-limited environment, such as a passenger cabin of a spacecraft, in which carbon dioxide and water may be recycled to produce oxygen gas, water, methane, and a variety of other compounds used in life support systems. FIG. 1 is a diagram illustrating an example closed-loop contaminant removal system 100 for concentrating contaminants from a cabin 102 using a gas separator 104 and removing the contaminants using a liquid sorbent.

Contaminant removal system 100 is configured to remove contaminants from cabin 102. Contaminants may include, but are not limited to, carbon dioxide, water, hydrocarbons, or the like. Cabin 102 may be a controlled environment, such as an aircraft cabin, spacecraft cabin, watercraft cabin, or the like. In the example of FIG. 1, cabin 102 may be a cabin of a closed-loop system, such as a spacecraft cabin or submarine cabin, in which components of a cabin air stream 110 from cabin 102, such as carbon dioxide and water, may be removed within contaminant removal system 100, allowing a purified supply air stream 118 to be generated. In some examples, cabin air stream 110 may have a carbon dioxide concentration between about 1000 ppm and about 5000 ppm and/or a hydrocarbon concentration between about 1 ppb and about 100 ppb. Supply air stream 118 has a lower concentration of the contaminant than cabin air stream 110. For example, supply air stream 118 may have a concentration of a contaminant that is about 25% to about 99% less than a concentration of the contaminant in cabin air stream 110, such as about 40% to about 95% less than the concentration of the contaminant in cabin air stream 110, or such as about 60% to about 80% less than the concentration of the contaminant in cabin air stream 110.

Contaminant removal system 100 includes a cabin air circuit configured to circulate cabin air between cabin 102 and gas separator 104. In the example of FIG. 1, cabin air stream 110 includes a filter 120 configured to remove particulates from cabin air stream 110 prior to entry into gas separator 104 and a compressor 122 configured to draw cabin air into gas separator 104, while supply air stream 118 includes a filter 124 configured to remove any leaked liquid sorbent and/or further filter clean air from supply air stream 118 prior to entry into cabin 102.

Contaminant removal system 100 includes gas separator 104. Gas separator 104 is configured to receive cabin air from cabin air stream 110 and separate cabin air stream 110 into a concentrated cabin air stream 112 having concentrated cabin air and a diluted cabin air stream 114 having diluted cabin air. Gas separator 104 is configured to concentrate one or more contaminants from cabin air stream 110 to produce concentrated cabin air stream 112 having a higher concentration of the contaminant than cabin air stream 110. For example, concentrated cabin air stream 112 may have a concentration of the contaminant that is about 200% to about 1000% that of the concentration of the contaminant in cabin air stream 110. Gas separator 104 is configured to discharge concentrated cabin air stream 112 to scrubber-separator 106.

Correspondingly, gas separator 104 is configured to dilute one or more contaminants from cabin air stream 110 to produce diluted cabin air stream 114 having a lower concentration of the contaminant than cabin air stream 110 and concentrated cabin air stream 112. For example, diluted cabin air stream 114 may have a concentration of the contaminant that is about 10% to about 95% that of the concentration of the contaminant of cabin air stream 110. Gas separator 104 is configured to discharge diluted cabin air stream 114 to cabin 102. Prior to entering cabin 102, diluted cabin air stream 114 may be mixed with a clean air stream 116 from scrubber-separator 106. For example, a manifold may receive diluted cabin air stream 114 and clean air stream 116, combine diluted cabin air stream 114 and clean air stream 116 to form supply air stream 118, and discharge supply air stream 118 to cabin 102.

As discussed herein, concentrated cabin air stream 112 and diluted cabin air stream 114 may be in reference to one or more contaminants in the stream and not necessarily with regard to other contaminants or components in the stream. For example, concentrated cabin air stream 112 may have a higher concentration of one or more contaminants than cabin air stream 110 and a lower concentration of other components, such as inert gases or other contaminants, than cabin air stream 110. Similarly, diluted cabin air stream 114 may have a lower concentration of one or more contaminants than cabin air stream 110 and a higher concentration of other components, such as inert gases or other contaminants, than cabin air stream 110.

In some examples, gas separator 104 includes a membrane separator. For example, cabin air stream 110 may enter gas separator 104 as a feed gas stream and contact one or more membranes. These membranes may have a higher affinity for the contaminant than other components of cabin air stream 110, such that the contaminant may diffuse through the membrane at a higher rate than the other components of cabin air stream 110. As such, a portion of cabin air stream 110 may permeate through one or more membranes of gas separator 104 and discharge from gas separator 104 as concentrated cabin air stream 112 (permeant stream), while the remainder of cabin air stream 110 may pass through and discharge from gas separator 104 as diluted cabin air stream 114 (retentate stream).

In some examples, gas separator 104 may be configured to assist in returning humidity from cabin air stream 110 to the cabin in air stream 118. For example, gas separator 104 may have a higher affinity for a contaminant, such as carbon dioxide, than water, such that gas separator 104 may concentrate the contaminant in concentrated cabin air stream 112 to a greater degree than water. As a result, diluted cabin air stream 114 may contain a relatively high concentration of water vapor compared to a concentration of the contaminants, thus returning a portion of water vapor from cabin air stream 110 to cabin 102. In this way, a humidity of cabin air stream 110 may be preserved.

In some examples, gas separator 104 may be configured to assist in controlling a relative oxygen concentration of supply air stream 118. For example, gas separator 104 may increase a relative concentration of oxygen with respect to nitrogen in either diluted cabin air stream 114 or concentrated cabin air stream 112, such as through physical separation through a polyimide or polysulfone membrane. Whichever of diluted cabin air stream 114 or concentrated cabin air stream 112 includes the higher relative concentration of oxygen may be recycled as supply air stream 118, while whichever of diluted cabin air stream 114 or concentrated cabin air stream 112 includes the lower relative concentration of oxygen may be purged or vented. In this way, a concentration of oxygen in supply air stream 118 may be increased.

Contaminant removal system 100 may include one or more pressure control valves 160 coupled to concentrated cabin air stream 112 and/or diluted cabin air stream 114. Pressure control valve 160 is configured to control a pressure differential across gas separator 104. For example, in examples in which gas separator 104 is a membrane separator, a pressure differential between a feed/retentate side and a permeant side of one or more membranes may provide a driving force for contaminants to permeate across the one or more membranes from cabin air stream 110 into concentrated cabin air stream 112. Increasing the pressure differential across gas separator 104 may increase a rate of permeation of the contaminant across gas separator 104, such that a higher concentration of contaminants may be present in concentrated cabin air stream 112.

Contaminant removal system 100 includes a liquid sorbent circuit 126 configured to circulate liquid sorbent between scrubber-separator 106 and stripper-separator 108. For example, a pump 134 may pump clean liquid sorbent from a clean liquid sorbent storage 132 and/or stripper-separator 108 into scrubber-separator 106. Clean liquid sorbent may include unused liquid sorbent free of contaminants or regenerated liquid sorbent having a lower concentration of contaminants than the used liquid sorbent. In some examples, the clean liquid sorbent may be cooled by a cooler 136 prior to entry into scrubber-separator 106. In some examples, the used liquid sorbent may be preheated by a heat exchanger 128 and/or heater 130 prior to entry into stripper-separator 108.

Contaminant removal system 100 includes a scrubber-separator 106 downstream of gas separator 104. Scrubber-separator 106 is configured to absorb the contaminant from concentrated cabin air stream 112 into a liquid sorbent and discharge a clean air stream 116 to cabin 102. Clean air stream 116 has a lower concentration of the contaminant than cabin air stream 110. For example, clean air stream 116 may have a concentration of a contaminant that is about 25% to about 99% less than a concentration of the contaminant in cabin air stream 110

On a gas phase side, scrubber-separator 106 is configured to receive concentrated cabin air from concentrated cabin air stream 112 that includes contaminant species from cabin 102, such as carbon dioxide, water, hydrocarbon volatiles, and other gaseous substances. Scrubber-separator 106 is configured to absorb one or more contaminant species in the concentrated cabin air into a liquid sorbent. Scrubber-separator 106 includes one or more separation membranes, each configured to flow (e.g., provide or direct flow of) concentrated cabin air from concentrated cabin air stream 112 on a gas phase side (e.g., a shell side) of the respective membrane and flow a liquid sorbent on a liquid phase side (e.g., a tube side) of the membrane. Contaminants may pass through the membrane due to a concentration gradient between the concentrated cabin air and the liquid sorbent and become absorbed by the liquid sorbent, while the liquid sorbent may not substantially flow through the membrane. As a result, clean air from clean air stream 116 discharged from scrubber-separator 106 may have a lower concentration of contaminants than concentrated cabin air from cabin air stream 112 received by scrubber-separator 106. Scrubber-separator 106 is configured to discharge a clean air stream 116 to cabin 102. For example, as mentioned above, clean air stream 116 may be mixed with diluted cabin air stream 114 to form supply air stream 118.

On a liquid phase side, scrubber-separator 106 is configured to receive clean liquid sorbent, such as from liquid sorbent storage 132. The clean liquid sorbent may flow through scrubber-separator 106 and absorb contaminants from concentrated cabin air through the membrane(s) of scrubber-separator 106. As a result, the used liquid sorbent discharged from scrubber-separator 106 may have a higher concentration of contaminants than the clean liquid sorbent received by scrubber-separator 106. Scrubber-separator 106 may discharge the used liquid sorbent containing the contaminants to stripper-separator 108.

By concentrating contaminants in concentrated cabin air stream 112 prior to removing contaminants with scrubber-separator 106, contaminant removal system 100 may more efficiently remove contaminants from cabin 102. A rate of removal of contaminants by scrubber-separator 106 may be dependent on a partial pressure of the contaminant. For example, a flux of the contaminant through a membrane of scrubber-separator 106 and into the liquid sorbent may be generally represented by Equation 1 below, in which $J_i$ is the flux of the contaminant, k is the mass transfer coefficient of the contaminant through the membrane, $p_i$ is the partial pressure of the contaminant on a gas side of the membrane, H is Henry's law constant, and $C_i$ is a concentration of the contaminant on the liquid side of the membrane:

$$J_i = k\left(\frac{p_i}{H} - C_i\right) \quad \text{[Equation 1]}$$

Figure 6:
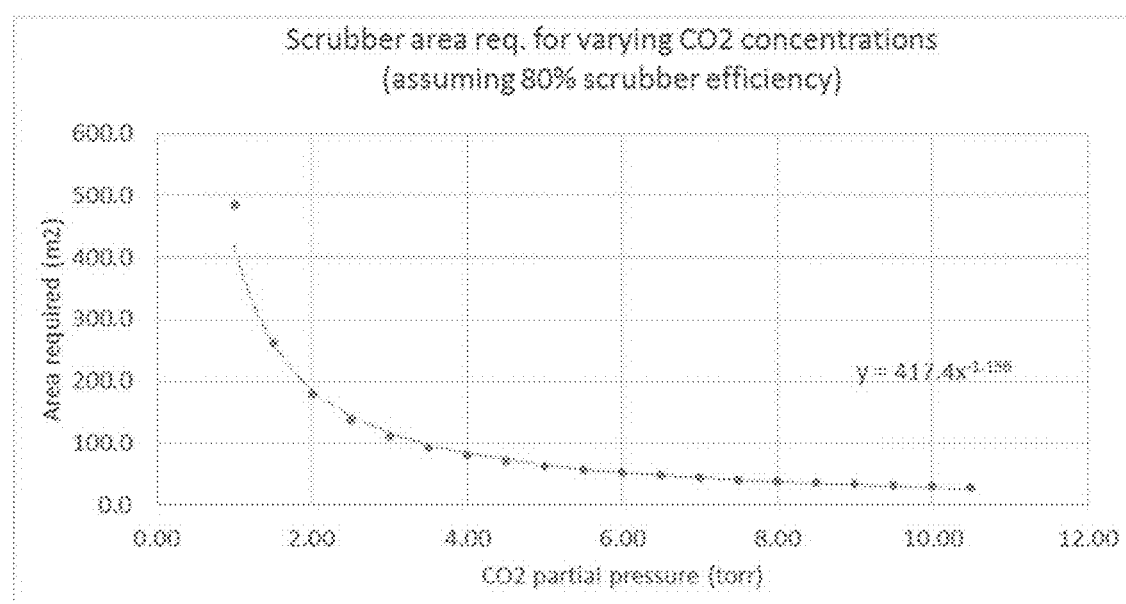
FIG. 6 is a graph illustrating an area of an example scrubber-separator versus carbon dioxide concentration.

By increasing a partial pressure of the contaminant in concentrated cabin air stream 112, scrubber-separator 106 may remove a greater amount of the contaminant from concentrated cabin air stream 112 as compared to if scrubber-separator 106 directly received cabin air stream 110 without concentrating the contaminant in concentrated cabin air stream 112. FIG. 6 is a graph illustrating a membrane surface area of an example scrubber-separator versus carbon dioxide concentration. As a partial pressure of the carbon dioxide increases, a membrane area of scrubber-separator required to remove a specified amount of carbon dioxide from air decreases. Thus, for a quantity or rate of contaminant removed from concentrated cabin air stream 112, scrubber-separator 106 may utilize less liquid sorbent and, correspondingly, have a smaller size than a scrubber-separator that does not concentrate a contaminant in a cabin air stream using a gas separator.

Gas separator 104 may include one or more membrane separators configured to flow air on a first side and discharge air on a permeant side. For example, a membrane separator may include one or more dense, nonporous selective layers that separate gases due to differences in transport rate through the selective layers. Each component of a gas stream, such as carbon dioxide or water, may be sorbed by the selective layer at one surface, transported across the selective layer by a gas concentration gradient, and desorbed at the opposing surface. This transport may occur at different rates for different components of the gas stream. As a result, components may be separated as a permeate stream having higher concentrations of components that pass through the selective layers at higher rates and a retentate stream having higher concentrations of components that pass through the selective layers at lower rates. The selective layers may be attached to a support layer, such as a porous support layer. Membrane materials may include, but are not limited to, hydrophobic materials such as polyimide, polysulfone, polypropylene, polyvinylidene fluoride, polytetrafluoroethylene (PTFE), and the like. In some examples, a coating may be applied to improve the selectivity of the membrane separator for some components of the gas stream to pass through over other components.

Contaminant removal system 100 includes a stripper-separator 108 downstream of scrubber-separator 106. Stripper-separator 108 is configured to desorb the contaminant from the liquid sorbent into a contaminant stream 140. On a liquid phase side, stripper-separator 108 is configured to receive used liquid sorbent from scrubber-separator 106 and desorb one or more contaminants from the used liquid sorbent. Stripper-separator 108 includes one or more membranes, each configured to flow the used liquid sorbent on one side (e.g., a tube side) of the membrane and contaminated air to a contaminant stream 140 on an opposite side (e.g., a shell side) of the membrane. Contaminants may flow across fibers of the membrane due to a concentration gradient, while the liquid sorbent may not substantially flow across the fibers of the membrane. As a result, clean liquid sorbent discharged from stripper-separator 108 may have a lower concentration of contaminants than the used liquid sorbent received by stripper-separator 108. On a gas phase side, stripper-separator 108 is configured to discharge the contaminant in a contaminant stream 140. Contaminant stream 140 may be continuously removed from stripper-separator 108 to assist migration of the contaminants from the used liquid sorbent into contaminant stream 140.

Scrubber-separator 106 and/or stripper-separator 108, may include one or more membrane separators configured to flow air on a first side and flow liquid sorbent on a second, opposite side. For example, a membrane separator may include a plurality of parallel membrane contactors. In some examples, a membrane contactor may include a cylindrical module filled with parallel or woven hollow porous fibers. For example, dimensions of these hollow fibers could be less than about 3 mm, and the pore dimension could be less than about 2 microns. The high surface area of the hollow fiber membrane contactors enables a high mass transfer of contaminant gasses, such as carbon dioxide and water, into the liquid sorbent using a relatively small system volume and weight. In some examples, baffles or other structures, such as threads or other fibers, may also be present between the fibers, between the fibers and the outer shell, or perpendicular to fibers to improve mixing of the fluid on the shell side. In some examples, flow on the shell side may be swirled or turbulated using duct bends prior to entry into the membrane module and/or angling flow entry vector into the module and/or using guide vanes or similar structures to enhance mass transfer across the membrane. Ports on ends of the modules may connect to a manifold (e.g., a "tube sheet") allowing fluid flow from the ports through the bore of each fiber and hence to the opposing port. Additional ports may access the shell-side at opposite ends of the module, allowing fluid flow on the outside of the fibers through the module. The material of the hollow fibers can be selected such that the liquid sorbent does not wet the pores, and the trans-membrane pressure is kept sufficiently low to prevent pore penetration. As a result, the membrane contactor may ensure that the liquid sorbent and gas stream do not need further separation, such that contaminant removal system 200 may act in a gravity-independent way without the use of moving parts. Fiber materials may include, but are not limited to, hydrophobic materials such as polypropylene, polyvinylidene fluoride, polysulfone, polyimide, polytetrafluoroethylene (PTFE), and the like. In some examples, a coating may be applied to reduce liquid flow through the pores. Coatings that may be used include, but are not limited to, PTFE, a crosslinked siloxane, and the like to prevent liquid flow through the pores. While described in FIG. 1 as flowing through a "tube" side, liquid sorbent flow can be either on the "tube" side or the "shell" side, while air is flowed on the opposite side.

In some examples, the liquid sorbent may be a liquid ionic sorbent. Such liquid ionic sorbents may be salts that are generally comprised of an anion and organic cation. These salts may be liquid at their temperature of use, have effectively zero vapor pressure, be generally nontoxic, and/or have sufficient stability to resist deterioration. In some examples, liquid sorbents may contain relatively large organic cations and any of a variety of anions, which may be tailored to obtain desired characteristics. Liquid sorbents may be water soluble, hygroscopic (i.e., capable of absorbing moisture from the air), and/or capable of releasing water by evaporation, such as by elevating the temperature or reducing the water partial pressure.

In the example of FIG. 1, contaminant removal system may include one or more systems or components configured to further process contaminant stream 140. In some examples, contaminant removal system 100 includes a compressor 142, condenser 144, and water separator 146 configured to compress contaminant stream 140 and remove water from the compressed contaminant stream 140. For example, for carbon dioxide removed from contaminant removal system 100 to be stored or recycled, compressor 142, condenser 144, and water separator 146 may compress contaminant stream 140 to a high pressure and remove nearly all water from contaminant stream 140. In a life support application, a large amount of water may be present in cabin air stream 110. For example, the concentration of water in cabin air stream 110 may be much higher than that of carbon dioxide. Sabatier system 150 may require a water concentration of less than 2% to react hydrogen gas with carbon dioxide.

Compressor 142 is configured to compress contaminant stream 140. Due to compression of contaminant stream 140, an outlet pressure and temperature of compressor 142 may be higher than an inlet pressure and temperature, while an outlet volumetric flow rate of compressor 142 may be lower than an inlet volumetric flow rate of compressor 142. A variety of compressors may be used for compressor 142 including, but not limited to, centrifugal compressors, positive displacement compressors, and the like.

Condenser 144 is configured to cool contaminant stream 140 and condense water from contaminant stream 140. For example, condenser 144 may be coupled to a refrigeration system or other cooling system that circulates a cooling medium to cool contaminant stream 140. Due to cooling and/or condensation of water from contaminant stream 140, an outlet condenser temperature of contaminant stream 140 may be lower than an inlet condenser temperature of contaminant stream 140. A variety of condensers may be used for condenser 144 including, but not limited to, shell and tube heat exchangers, plate-fin, surface coolers, heat pipes, thermoelectric devices, cooling jackets, and the like. While shown as a separate unit, in some examples, condenser 144 may be integrated with at least one of compressor 142 and/or water separator 146 into a single unit. For example, condenser 144 may be cooling jackets thermally coupled to at least one of compressor 142 and/or water separator 146.

Water separator 146 is configured to remove water from contaminant stream 140, discharge a dehumidified contaminant stream 148 to Sabatier system 150, and discharge contaminant water stream 152 to either water vaporizer 154

(as shown in FIG. 1) or water storage 158. Due to this water removal, an amount of water discharged by water separator 146 in dehumidified contaminant stream 148 may be less than an amount of water received by water separator 146. A variety of water separators may be used including, but not limited to, static phase separators, capillary phase separator, membrane phase separators, centrifugal/rotary separators, and the like. Depending on the amount of water that must be removed, water separator 146 may be integrated into condenser 144 to reduce size further.

In examples in which the contaminant includes carbon dioxide, contaminant removal system 100 may include a Sabatier system 150 configured to convert the carbon dioxide to methane. Sabatier system 150 may be configured to react dehumidified contaminant stream 148 with hydrogen to produce water and methane, pressurize the methane to well above ambient pressure, and dry the methane for storage as fuel or send the methane to other reactors for further conversion. The resulting dried and pressurized methane may be highly compressed to form methane for rocket fuel, while the resulting water may be stored and/or used for drinking water.

In some examples, contaminant removal system 100 includes a water vaporizer 154. Water vaporizer 154 is configured to discharge a sweep gas stream 138 to stripper-separator 108 that contains removed water from contaminant stream 140. For example, stripper-separator 108 may lose water from the liquid sorbent and require replacement water to maintain a desired water concentration of the liquid sorbent. In the example of FIG. 1, water vaporizer 154 is configured to add water from water separator 146 or water storage 158 to sweep gas stream 138 of stripper-separator 108. Water storage 158 may either receive water from or discharge water to water vaporizer 548. Water vaporizer 548 may vaporize a portion of the removed water to sweep gas stream 138, either from water separator 146 or water storage 158, and discharge sweep gas stream 138 into stripper-separator 108. By receiving a humid sweep gas stream 138, stripper-separator 108 may operate at a higher efficiency for desorbing contaminants.

Contaminant removal system 100 may include a process control system that includes a controller 170 and one or more sensor sets 162, 164, 166, 168. Controller 170 may be configured to receive measurements from the one or more sensor sets 162, 164, 166, 168 and/or components of contaminant removal system 100 and/or send control signals to components of contaminant removal system 100. Controller 170 may be communicatively coupled to and configured to receive measurement signals from the one or more sensor sets 162, 164, 166, 168, and other process control components (not shown) of contaminant removal system 100, such as: control valves for cabin air stream 110, clean air stream 116, supply air stream 118, sweep gas stream 138, contaminant stream 140, and inlets/outlets to heat exchanger 128, heater 130, liquid sorbent storage 132, and cooler 136; pump 134; blower 122, compressor 142, and the like. For example, controller 170 may control a pumping speed of compressor 142. Controller 170 may include any of a wide range of devices, including control circuitry, processors (e.g., one or more microprocessors, one or more application specific integrated circuits (ASICs), one or more field programmable gate arrays (FPGAs), or the like), processing circuitry, one or more servers, one or more desktop computers, one or more notebook (i.e., laptop) computers, one or more cloud computing clusters, or the like.

Sensor sets 162, 164, 166, 168 may include instrumentation configured to detect any of a pressure, temperature, flow rate, and/or contaminant concentration (e.g., carbon dioxide concentration or water concentration) of a liquid or gas stream of contaminant removal system 100. For a gas separator 104, cabin air sensor set 162 may detect conditions of cabin air stream 110, concentrated cabin air sensor set 164 may detect conditions of concentrated cabin air stream 112, clean air sensor set 166 may detect conditions of clean air stream 116, and supply air sensor set 168 may detect conditions of supply air stream 118. Controller 170 may be configured to use the detected conditions to control operation of contaminant removal system 100 to function as described in the application.

In some examples, controller 170 is configured to control a contaminant concentration within the environment of cabin 102. For example, controller 170 may be configured to receive a contaminant concentration measurement for a contaminant, such as from cabin air sensor set 162 or a contaminant concentration sensor in cabin 102. Controller 170 may be configured to determine whether the contaminant concentration measurement exceeds a contaminant concentration setpoint. For example, the contaminant concentration setpoint may be a target concentration of supply air stream 118 for maintaining cabin 102 below a threshold contaminant concentration. Controller 170 may be configured to send, in response to the contaminant concentration measurement exceeding the contaminant concentration setpoint, a control signal to decrease a concentration of the contaminant in supply air stream 118. For example, controller 170 may send a control signal to increase a pressure differential across gas separator 104, a flow rate of liquid sorbent, a flow rate, humidity, and/or temperature of sweep gas stream 138, or any other variable that may increase a rate of removal of contaminants from cabin air stream 110.

In some examples, controller 170 may be configured to remove a contaminant from cabin air stream 110 by controlling, at least in part, a pressure differential across gas separator 104. For example, controller 170 may receive a contaminant concentration measurement from clean air stream 116 and/or supply air stream 118 indicating that a concentration of the contaminant is above a threshold. Controller 170 may determine that the concentration of the contaminant is above the threshold and, in response, control pressure control valve 160 to control a pressure differential across a gas separator 104 to increase the concentration of the contaminant in concentrated cabin air stream 112 and/or decrease the concentration of the contaminant in diluted cabin air stream 114.

In some examples, controller 170 may be configured to control a water vapor concentration and/or humidity within the environment of cabin 102. For example, to recover water from contaminant stream 140, controller 170 may receive a water vapor concentration and/or humidity of clean air stream 116 and, in response to determining that the water vapor concentration and/or humidity is outside a target humidity range, increase condensation and/or separation of water from contaminant stream 140, such as by increasing a flow rate of cooling fluid to condenser 144 and/or increasing a speed of a mechanical separation device (centrifugal) of water separator 146. For example, cabin air within cabin 102 may have a target humidity range for passenger comfort, such as between about 5% and about 35% relative humidity. As another example, to recycle the recovered water from contaminant stream 140, controller 170 may receive a water concentration of liquid sorbent circuit 126 and, in response to the water concentration measuring below a threshold water concentration, control a flow control valve to discharge removed water from water storage 158 into liquid sorbent circuit 126. As another example, to control a water vapor concentration and/or humidity of stripper-separator 108, controller 170 may receive a water vapor concentration and/or humidity measurement from stripper-separator 108 and, in response to determining that the water vapor concentration and/or humidity measurement is outside a target humidity range, control water vaporizer 154 to increase or decrease a water vapor concentration and/or humidity of stripper-separator 108.

Figure 2:
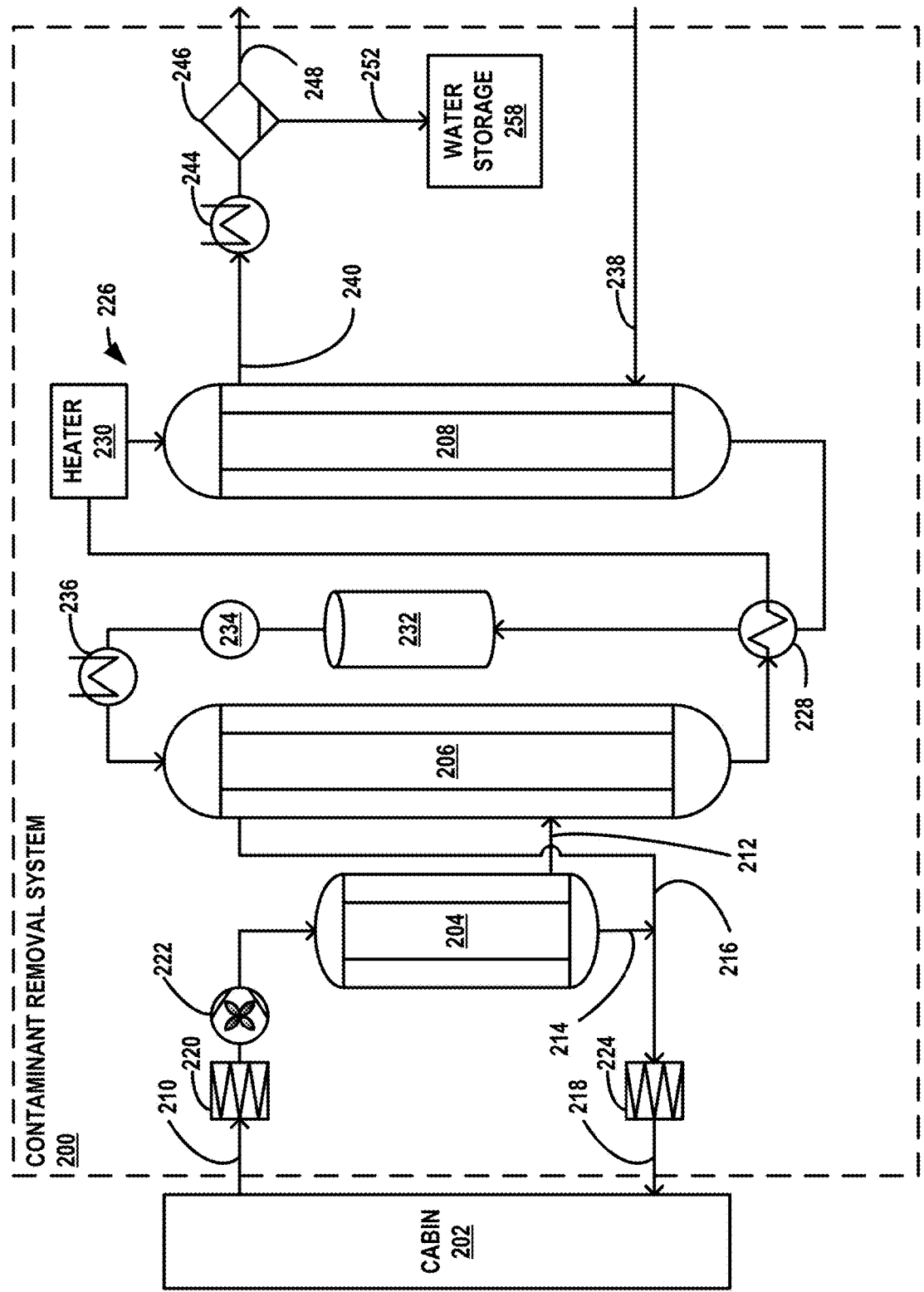
FIG. 2 is a diagram illustrating an example open-loop contaminant removal system for concentrating contaminants from a cabin using a gas separator and removing the contaminants using a liquid sorbent.

In some examples, contaminant removal systems discussed herein may be used in an ECS of an environment, such as an aircraft cabin, in which various contaminants may be discharged from the environment. FIG. 2 is a diagram illustrating an example open-loop contaminant removal system for concentrating contaminants from a cabin using a gas separator and removing the contaminants using a liquid sorbent. Unless otherwise indicated, components of contaminant removal system 200 may be operably similar to similarly named and/or numbered components of contaminant removal system 100 of FIG. 1. For example, a cabin 202, a cabin air stream 210, a concentrated cabin air stream 212, a diluted cabin air stream 214, a clean air stream 216, a supply air stream 218, a filter 220, a blower 222, a filter 224, a liquid sorbent circuit 226, a heat exchanger 228, a heater 230, a liquid sorbent storage 232, a pump 234, a cooler 236, a contaminant stream 240, a condenser 244, a water separator 246, dehumidified contaminant stream 248, contaminant water stream 252, and water storage 258 may be functionally similar to a cabin 102, cabin air stream 110, concentrated cabin air stream 112, diluted cabin air stream 114, clean air stream 116, supply air stream 118, filter 120, blower 122, filter 124, liquid sorbent circuit 126, heat exchanger 128, heater 130, liquid sorbent storage 132, pump 134, cooler 136, contaminant stream 140, condenser 144, water separator 146, dehumidified contaminant stream 148, contaminant water stream 152, and water storage 158, respectively.

In the example of FIG. 2, stripper-separator 208 is configured to receive a sweep gas stream 238 from an external environment. For example, contaminant removal system 200 may decrease the partial pressure of a contaminant in the gas side of stripper-separator 208 by providing a vacuum or sweep gas to stripper-separator 208. A sweep gas may be a relatively inert gas used to create a partial pressure gradient on the gas phase side of the membrane of stripper-separator 208 to drive removal of contaminants from the liquid sorbent into contaminant stream 240. Stripper-separator 208 is fluidically coupled to sweep gas stream 238 that is configured to supply a sweep gas to stripper-separator 208. In some examples, stripper-separator 208 is configured to desorb the contaminant using a ram air stream as a sweep gas stream 238. For example, ram air from outside an aircraft may remove desorbed contaminants from the membrane to maintain a low concentration of contaminants at the membrane to increase a rate of desorption of the contaminants from the used liquid sorbent. As another example, during flight, a pressure of the atmosphere outside the aircraft may be low, creating a vacuum on stripper-separator 208 to increase a rate of desorption of the contaminants from the used liquid sorbent without a sweep gas stream. As such, use of ram air as a sweep gas and/or altitude-based pressure difference as a vacuum may assist in contaminant removal from stripper-separator 208.

Figure 3:
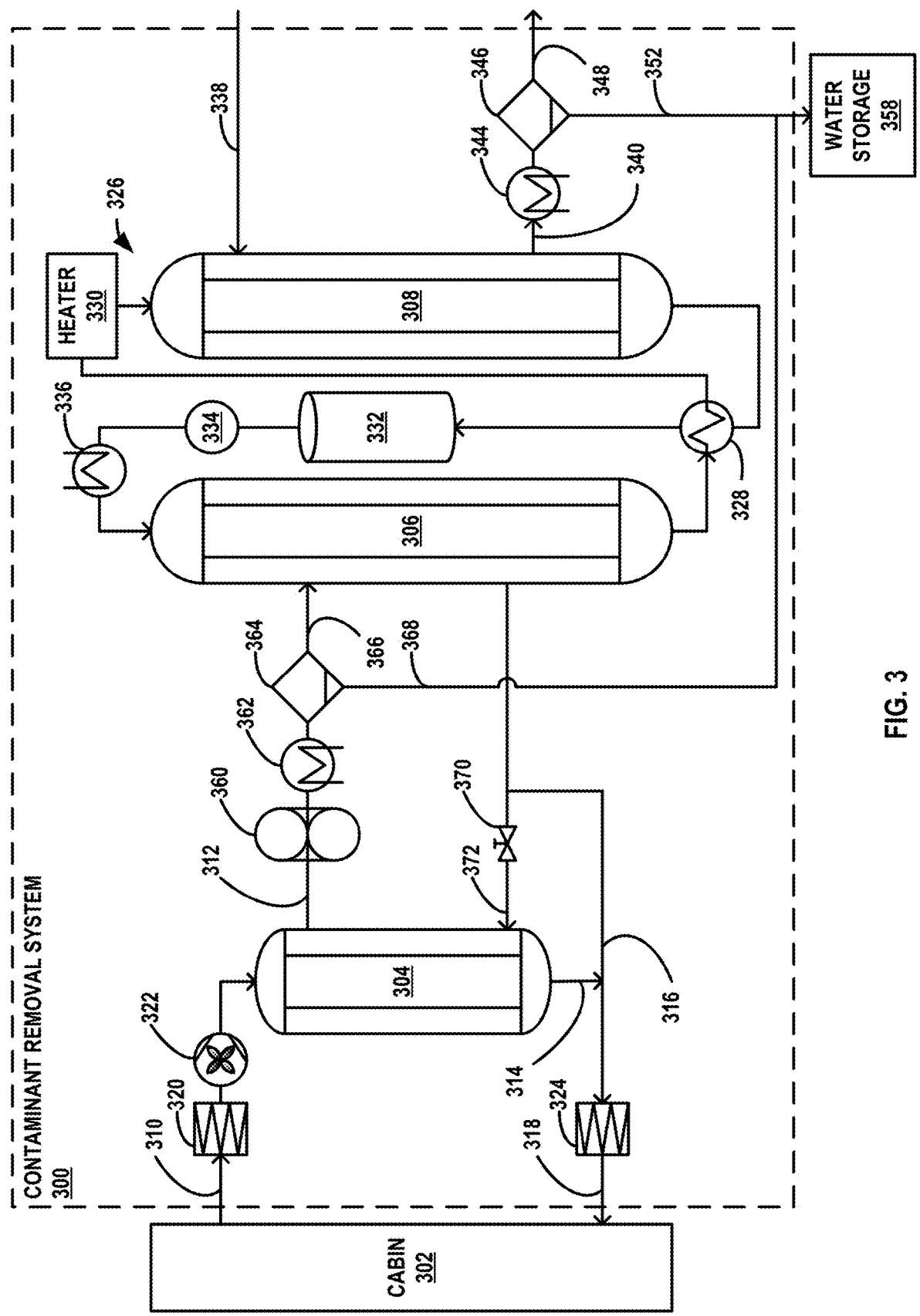
FIG. 3 is a diagram illustrating an example contaminant removal system for concentrating contaminants from a cabin using a gas separator and a compression stage and removing the contaminants using a liquid sorbent.

In some examples, contaminant removal systems discussed herein may increase contaminant removal by using one or more compression stages to create a vacuum on a gas separator. FIG. 3 is a diagram illustrating an example contaminant removal system for concentrating contaminants from a cabin using a gas separator and a compression stage and removing the contaminants using a liquid sorbent. Unless otherwise indicated, components of contaminant removal system 300 may be operably similar to similarly named and/or numbered components of contaminant removal system 200 of FIG. 2. For example, a cabin 302, a cabin air stream 310, a concentrated cabin air stream 312, a diluted cabin air stream 314, a clean air stream 316, a supply air stream 318, a filter 320, a blower 322, a filter 324, a liquid sorbent circuit 326, a heat exchanger 328, a heater 330, a liquid sorbent storage 332, a pump 334, a cooler 336, a contaminant stream 340, a condenser 344, a water separator 346, dehumidified contaminant stream 348, contaminant water stream 352, and water storage 358 may be functionally similar to a cabin 202, cabin air stream 210, concentrated cabin air stream 212, diluted cabin air stream 214, clean air stream 216, supply air stream 218, filter 220, blower 222, filter 224, liquid sorbent circuit 226, heat exchanger 228, heater 230, liquid sorbent storage 232, pump 234, cooler 236, contaminant stream 240, condenser 244, water separator 246, dehumidified contaminant stream 248, contaminant water stream 252, and water storage 258, respectively.

In some examples, contaminant removal system 300 includes a compressor 360 downstream of gas separator 304. Compressor 360 is configured to create or assist in creating a pressure differential across gas separator 304. Compressor 360 is configured to receive concentrated cabin air stream 312 at a compressor inlet pressure, compress concentrated cabin air stream 312, and discharge concentrated cabin air stream 312 at a compressor outlet pressure to scrubber-separator 306. Due to compression of concentrated cabin air stream 312, compressor 360 creates a vacuum on concentrated cabin air stream 312 and, correspondingly, on gas separator 304. This vacuum may increase a pressure differential across gas separator 304 (e.g., across a membrane of gas separator 304), thus increasing a rate of removal of contaminants from cabin air stream 310. In the example of FIG. 3, contaminant removal system 300 includes a condenser 362 configured to condense water from concentrated cabin air stream 312 and a water separator 364 configured to remove water from concentrated cabin air stream 312 to cabin water stream 368; however, in other examples, condenser 362, water separator 364, and/or cabin water stream 368 may be omitted.

In some examples, contaminant removal system 300 may be configured to receive a portion of clean air stream 316 as a sweep gas stream 372. For example, a sweep gas control valve 370 may control sweep gas stream 372 to decrease the partial pressure of a permeant side of gas separator 104, thereby further driving permeation of contaminants from cabin air stream 110 into concentrated cabin air stream 112 and concentrating the contaminants in concentrated cabin air stream 112.

In some examples, a controller (not shown) may be configured to remove a contaminant from cabin air stream 310 by controlling, at least in part, a pressure differential across gas separator 304. For example, the controller may receive a contaminant concentration measurement from clean air stream 316 and/or supply air stream 318 indicating that a concentration of the contaminant is above a threshold. The controller may determine that the concentration of the contaminant is above the threshold and, in response, control compressor 360 to control a pressure differential across gas separator 304 to increase the concentration of the contaminant in concentrated cabin air stream 312 and/or decrease the concentration of the contaminant in diluted cabin air stream 314.

Figure 4A:
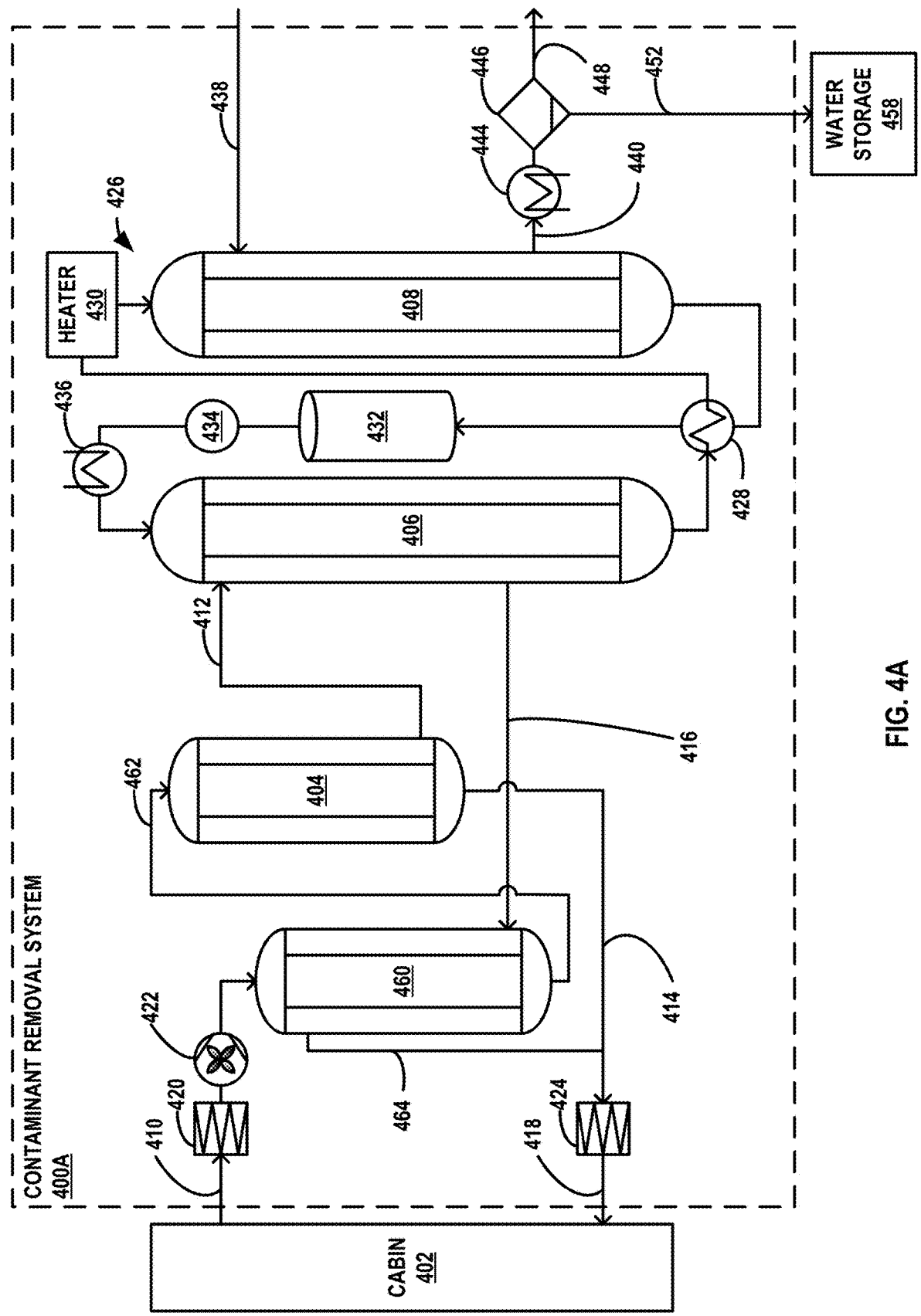
FIG. 4A is a diagram illustrating an example contaminant removal system for concentrating contaminants from a cabin using a gas separator, returning humidity to the cabin using a dehumidifier upstream of the gas separator, and removing the contaminants using a liquid sorbent.
Figure 4B:
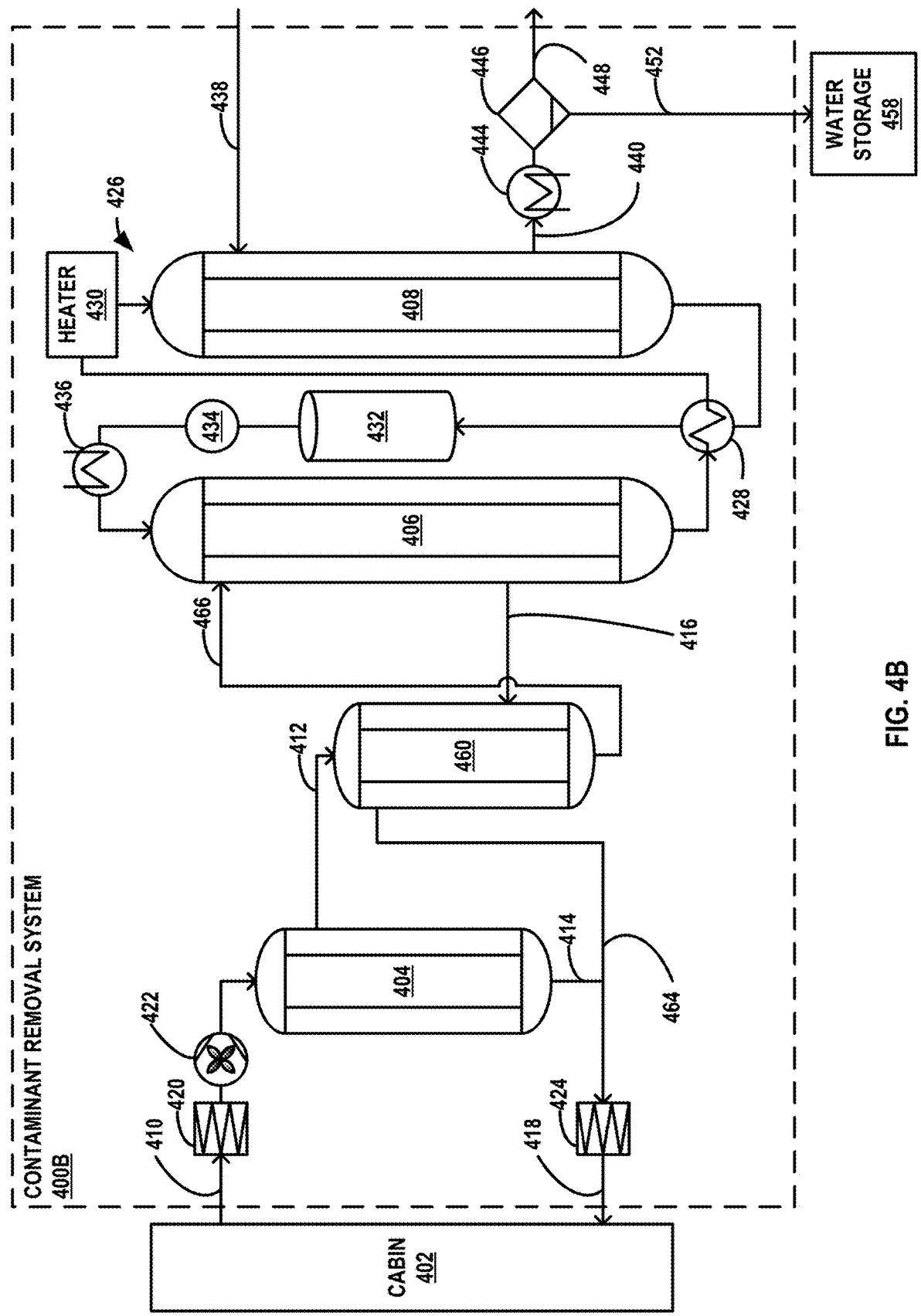
FIG. 4B is a diagram illustrating an example contaminant removal system for concentrating contaminants from a cabin using a gas separator, returning humidity to the cabin using a dehumidifier downstream of the gas separator, and removing the contaminants using a liquid sorbent.

In some examples, contaminant removal systems discussed herein may remove humidity from a cabin air stream using a membrane dehumidifier prior to a concentrated cabin air stream entering a scrubber-separator. FIGS. 4A and 4B illustrate various configurations of a membrane dehumidifier 460 in contaminant removal systems 400A and 400B, respectively. Dehumidifier 460 is configured to return humidity from at least one of cabin air stream 410 or concentrated cabin air stream 412 to clean air stream 416. By capturing humidity from cabin air prior to entry of the cabin air into scrubber-separator 406, a greater amount of humidity may be preserved. Unless otherwise indicated, components of contaminant removal systems 400A and 400B may be operably similar to similarly named and/or numbered components of contaminant removal system 200 of FIG. 2. For example, a cabin 402, a gas separator 404, a scrubber-separator 406, a stripper-separator 408, a cabin air stream 410, a concentrated cabin air stream 412, a diluted cabin air stream 414, a clean air stream 416, a supply air stream 418, a filter 420, a blower 422, a filter 424, a liquid sorbent circuit 426, a heat exchanger 428, a heater 430, a liquid sorbent storage 432, a pump 434, a cooler 436, a contaminant stream 440, a condenser 444, a water separator 346, dehumidified contaminant stream 448, contaminant water stream 452, and water storage 458 may be functionally similar to cabin 202, gas separator 204, scrubber-separator 206, stripper-separator 208, cabin air stream 210, concentrated cabin air stream 212, diluted cabin air stream 214, clean air stream 216, supply air stream 218, filter 220, blower 222, filter 224, liquid sorbent circuit 226, heat exchanger 228, heater 230, liquid sorbent storage 232, pump 234, cooler 236, contaminant stream 240, condenser 244, water separator 246, dehumidified contaminant stream 248, contaminant water stream 252, and water storage 258, respectively.

In some examples, dehumidifier 460 may capture humidity from cabin air stream 410 upstream of gas separator 404. FIG. 4A is a diagram illustrating an example contaminant removal system 400A for concentrating contaminants from cabin 402 using gas separator 404, maintaining a humidity from cabin 402 using dehumidifier 460 upstream of gas separator 404, and removing the contaminants using a liquid sorbent. During contaminant removal, water may be removed as a contaminant from concentrated cabin air stream 412 by scrubber-separator 406, such that clean air discharged to clean air stream 416 from scrubber-separator 406 may have a lower humidity than desired. In the example of FIG. 4A, dehumidifier 460 is configured to return humidity from cabin air stream 410 to clean air stream 416. On one side, dehumidifier 460 is configured to receive cabin air stream 410 as a feed gas stream and discharge cabin air in a dried cabin air stream 462 to gas separator 404 having a lower humidity than cabin air stream 410. On an opposite side, dehumidifier 460 is configured to receive clean air stream 416 from scrubber-separator 406 and discharge clean air to humidified clean air stream 464 having a higher humidity than clean air stream 416.

In some examples, dehumidifier 460 may capture humidity from cabin air stream 410 downstream of gas separator 404. FIG. 4B is a diagram illustrating an example contaminant removal system 400A for concentrating contaminants from cabin 402 using gas separator 404, maintaining a humidity from cabin 402 using dehumidifier 460 downstream of gas separator 404, and removing the contaminants using a liquid sorbent. In the example of FIG. 4B, dehumidifier 460 is configured to return humidity from concentrated cabin air stream 412 to clean air stream 416. On one side, dehumidifier 460 is configured to receive concentrated cabin air stream 412 as a feed gas stream and discharge concentrated cabin air in a dried concentrated cabin air stream 466 to gas separator 404 having a lower humidity than concentrated cabin air stream 412. On an opposite side, dehumidifier 460 is configured to receive clean air stream 416 from scrubber-separator 406 and discharge clean air to humidified clean air stream 464 having a higher humidity than clean air stream 416.

In some examples, a controller (not shown in FIGS. 4A and 4B) may be configured to control a humidity within the environment of cabin 402. For example, the controller may be configured to control various components of the cabin air circuit to increase a humidity of humidified clean air stream 464 using dehumidifier 460.

Figure 5:
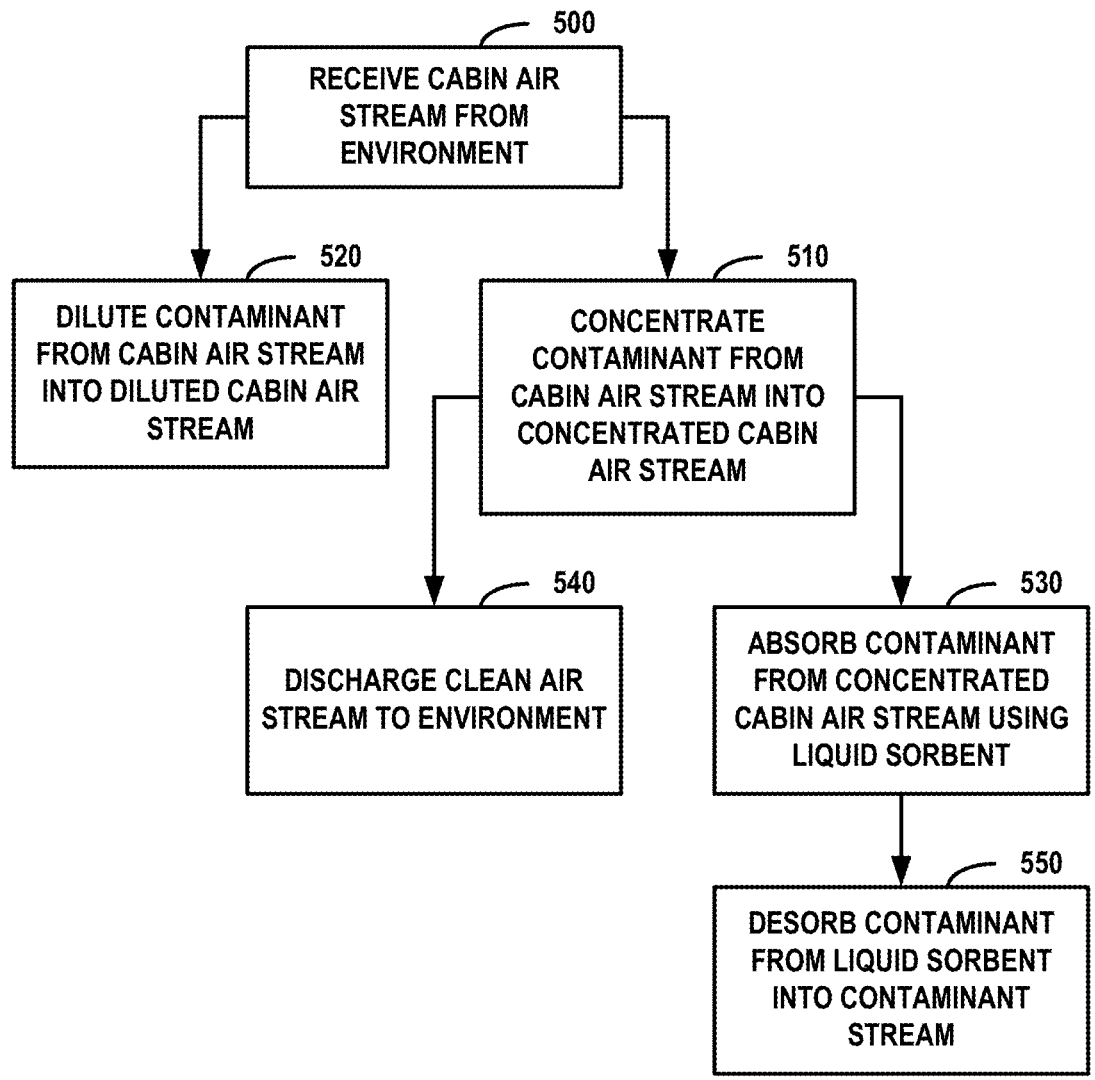
FIG. 5 is an example flowchart of a method for removing a contaminant from an environment.

FIG. 5 is an example flowchart of a method for removing a contaminant from an environment. FIG. 5 will be described with respect to contaminant removal system 100 of FIG. 1; however, the technique of FIG. 5 may be utilized with other contaminant removal systems. The example of FIG. 5 includes receiving, by gas separator 104, a cabin air stream 110 from an environment, such as cabin 102 (500). For example, controller 170 may detect that cabin air stream 110 has a concentration of one or more contaminants that is above a threshold and, in response, control components of the cabin air circuit to control a flow rate of cabin air stream 110.

The example of FIG. 5 includes concentrating, using gas separator 104, the contaminant from cabin air stream 110 to produce a concentrated cabin air stream 112, such that concentrated cabin air stream 112 has a higher concentration of the contaminant than cabin air stream 110 (510). The example of FIG. 5 includes diluting, using gas separator 104, the contaminant from cabin air stream 110 to produce a diluted cabin air stream 114, such that diluted cabin air stream 114 has a lower concentration of the contaminant than cabin air stream 110 (520). For example, controller 170 may control pressure control valve 160 or a compressor (not shown) to control a pressure differential across gas separator 104 to control a flow rate of concentrated cabin air stream 112 and/or diluted cabin air stream 114.

The example of FIG. 5 includes absorbing, by scrubber-separator 106, the contaminant from concentrated cabin air stream 112 using a liquid sorbent to produce clean air stream 116 (530). For example, controller 170 may control components of liquid sorbent circuit 126 to control a flow rate of liquid sorbent between scrubber-separator 106 and stripper-separator 108. The example of FIG. 5 includes discharging, by scrubber-separator 106, clean air stream 116 to the environment (540). The example of FIG. 5 includes desorbing, by stripper-separator 108, the contaminant from the liquid sorbent to produce contaminant stream 140 (550).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A contaminant removal system for removing a contaminant from an environment, comprising:
   a gas separator configured to receive a cabin air stream from the environment as a feed gas stream and separate the cabin air stream into a diluted cabin air stream as a retentate stream and a concentrated cabin air stream as a permeant stream to concentrate the contaminant from the cabin air stream into the concentrated cabin air stream, wherein the concentrated cabin air stream has a higher concentration of the contaminant than the cabin air stream, and wherein the gas separator is configured to concentrate the contaminant into the concentrated cabin air stream in response to a pressure differential across one or more membranes of the gas separator;
   a scrubber-separator downstream of the gas separator and configured to absorb the contaminant from the concentrated cabin air stream into a liquid sorbent and discharge a clean air stream to the environment; and
   a stripper-separator downstream of the scrubber-separator and configured to desorb the contaminant from the liquid sorbent into a contaminant stream.

2. The contaminant removal system of claim 1, further comprising a compressor downstream of the gas separator and configured to create a pressure differential across the one or more membranes of the gas separator.

3. The contaminant removal system of claim 1, further comprising a pressure control valve configured to control a pressure differential across the one or more membranes of the gas separator.

4. The contaminant removal system of claim 1, wherein the gas separator is further configured to discharge the diluted cabin air stream into the environment, and wherein the diluted cabin air stream has a lower concentration of the contaminant than the cabin air stream.

5. The contaminant removal system of claim 1, further comprising a water separator configured to remove water from the contaminant stream.

6. The contaminant removal system of claim 5, further comprising a water vaporizer configured to discharge a sweep gas stream containing the removed water to the stripper-separator.

7. The contaminant removal system of claim 5, further comprising:
   a Sabatier system; and
   a compressor upstream of the water separator and configured to compress the contaminant stream and discharge the compressed contaminant stream to the Sabatier system.

8. The contaminant removal system of claim 1, wherein the stripper-separator is configured to receive a sweep gas stream from an external environment to create a partial pressure gradient across the stripper-separator.

9. The contaminant removal system of claim 1, further comprising a dehumidifier configured to return humidity from at least one of the cabin air stream or the concentrated cabin air stream to the clean air stream.

10. The contaminant removal system of claim 1,
    wherein the contaminant is carbon dioxide, and
    wherein the one or more membranes of the gas separator are configured with a higher affinity for the carbon dioxide than water.

11. The contaminant removal system of claim 4, further comprising a manifold configured to:
    receive the diluted cabin air stream and the clean air stream;
    combine the diluted cabin air stream and the clean air stream to form a supply air stream; and
    discharge the supply air stream to the environment.

12. A method for removing a contaminant from an environment, comprising:
    receiving, by a gas separator, a cabin air stream from the environment as a feed gas stream;
    separating, using the gas separator, the cabin air stream into a diluted cabin air stream as a retentate stream and a concentrated cabin air stream as a permeant stream to concentrate the contaminant from the cabin air stream into the concentrated cabin air stream, wherein the concentrated cabin air stream has a higher concentration of the contaminant than the cabin air stream, and wherein the gas separator is configured to concentrate the contaminant in response to a pressure differential across one or more membranes of the gas separator;
    absorbing, by a scrubber-separator, the contaminant from the concentrated cabin air stream using a liquid sorbent to produce a clean air stream;
    discharging, by the scrubber-separator, the clean air stream to the environment; and desorbing, by a stripper-separator, the contaminant from the liquid sorbent to produce a contaminant stream.

13. The method of claim 12, further comprising controlling, by at least a compressor or a pressure control valve, the pressure differential across the one or more membranes of the gas separator.

14. The method of claim 12, further comprising discharging, by the gas separator, the diluted cabin air stream into the environment, wherein the diluted cabin air stream has a lower concentration of the contaminant than the cabin air stream.

15. The method of claim 12, further comprising:
removing, by a water separator, water from the contaminant stream; and
discharging, by a water vaporizer, a sweep gas stream containing the removed water to the stripper-separator.

16. The method of claim 15, further comprising:
compressing, by a compressor, the contaminant stream; and
discharging, by the compressor, the compressed contaminant stream to a Sabatier system.

17. The method of claim 12, further comprising receiving, by the stripper-separator, a sweep gas stream from an external environment to create a partial pressure gradient across the stripper-separator.

18. The method of claim 12, further comprising returning, by a dehumidifier, humidity from at least one of the cabin air stream or the concentrated cabin air stream to the clean air stream.

19. A contaminant removal system for removing carbon dioxide from an environment, comprising:
a gas separator configured to receive a cabin air stream from the environment and concentrate carbon dioxide from the cabin air stream to produce a concentrated cabin air stream, wherein the concentrated cabin air stream has a higher concentration of carbon dioxide than the cabin air stream, wherein the gas separator is configured to concentrate carbon dioxide in response to a pressure differential across one or more membranes of the gas separator, and wherein the one or more membranes of the gas separator are configured with a higher affinity for carbon dioxide than water;
a scrubber-separator downstream of the gas separator and configured to absorb carbon dioxide from the concentrated cabin air stream into a liquid sorbent and discharge a clean air stream to the environment; and
a stripper-separator downstream of the scrubber-separator and configured to desorb carbon dioxide from the liquid sorbent into a contaminant stream.

* * * * *